July 11, 1939.  A. S. HOWELL  2,165,706
PHOTOGRAPHIC CAMERA
Filed Sept. 3, 1937  2 Sheets-Sheet 1

INVENTOR
ALBERT S. HOWELL
BY Robert F. Miehle, Jr.
ATTY.

July 11, 1939.  A. S. HOWELL  2,165,706
PHOTOGRAPHIC CAMERA
Filed Sept. 3, 1937  2 Sheets-Sheet 2
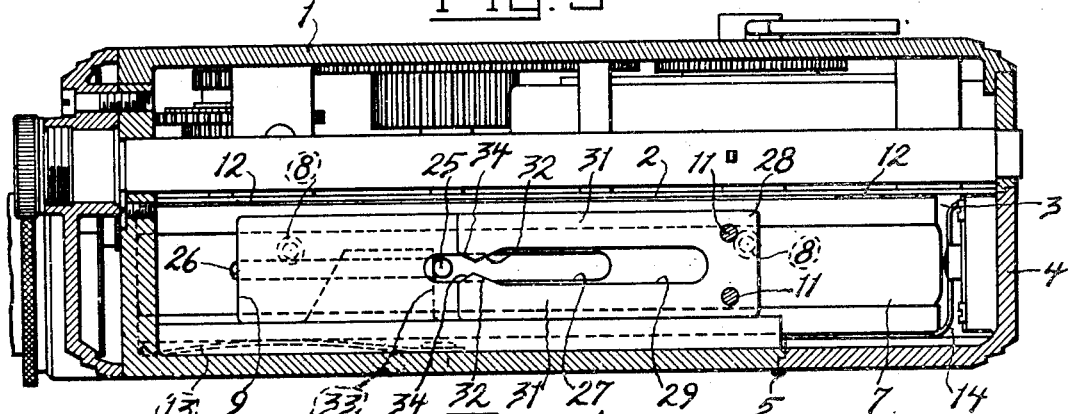
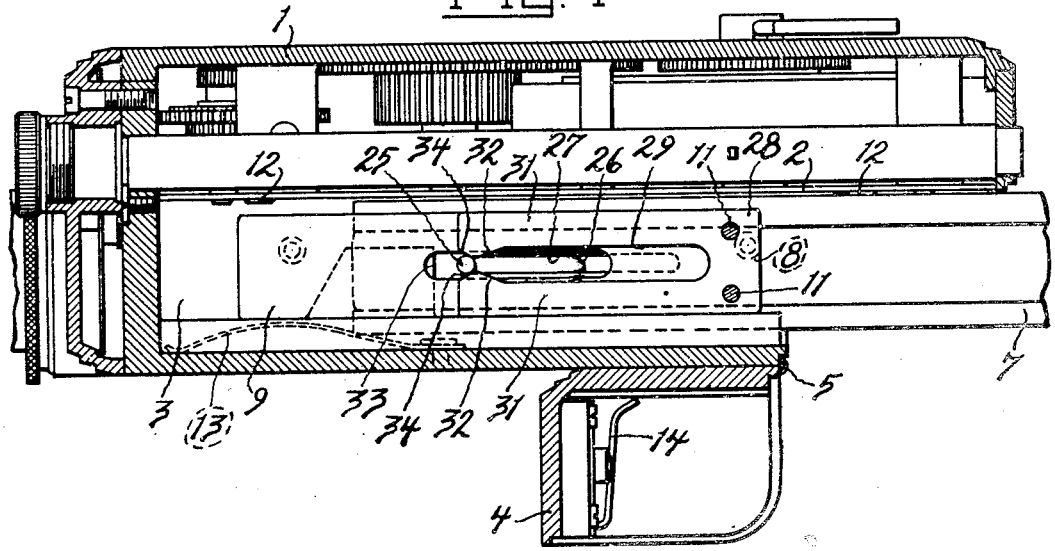
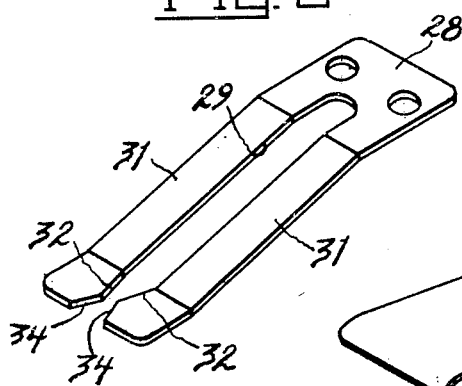
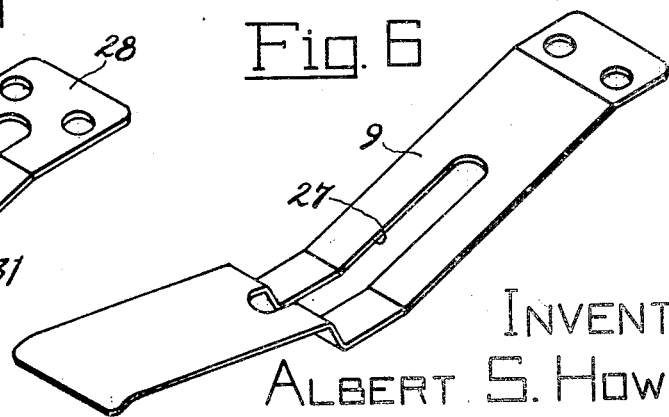
INVENTOR
ALBERT S. HOWELL
BY Robert F. Miehle, Jr.
ATTY.

Patented July 11, 1939

2,165,706

UNITED STATES PATENT OFFICE 2,165,706

PHOTOGRAPHIC CAMERA

Albert S. Howell, Chicago, Ill., assignor to The Bell & Howell Company, Chicago, Ill., a corporation of Illinois Application September 3, 1937, Serial No. 162,355

3 Claims. (Cl. 88—17)

My invention relates to photographic cameras of the interchangeable or removable film magazine type and particularly to motion picture cameras of this type.

It is usual to provide interchangeable film magazines with exposure aperture shutters for preventing film exposure while the magazines are not mounted on cameras, the aperture shutters being manually actuated to open and close while the magazines are mounted on the cameras.

An object of my invention resides in the provision of a simple and effective means whereby the magazine shutters are actuated automatically as an incident of interchange of the magazine on cameras to the end of dispensing with the necessity of manual actuation of the magazine shutters.

With this object in view my invention consists in certain features of novelty in the construction, combination and arrangement of parts by which the said object and certain other objects, hereinafter appearing, are effected, all as fully described with reference to the accompanying drawings and more particularly pointed out in the appended claims.

In the said drawings—

Figures 3 and 4 are similar sectional views substantially on the line 3—3 of Figure 1, but showing parts in different positions;

Figure 5 is a perspective view of the magazine shutter actuating spring, hereinafter described; and Figure 6 is a perspective view of one of the magazine guide springs hereinafter described.

Figure 1:
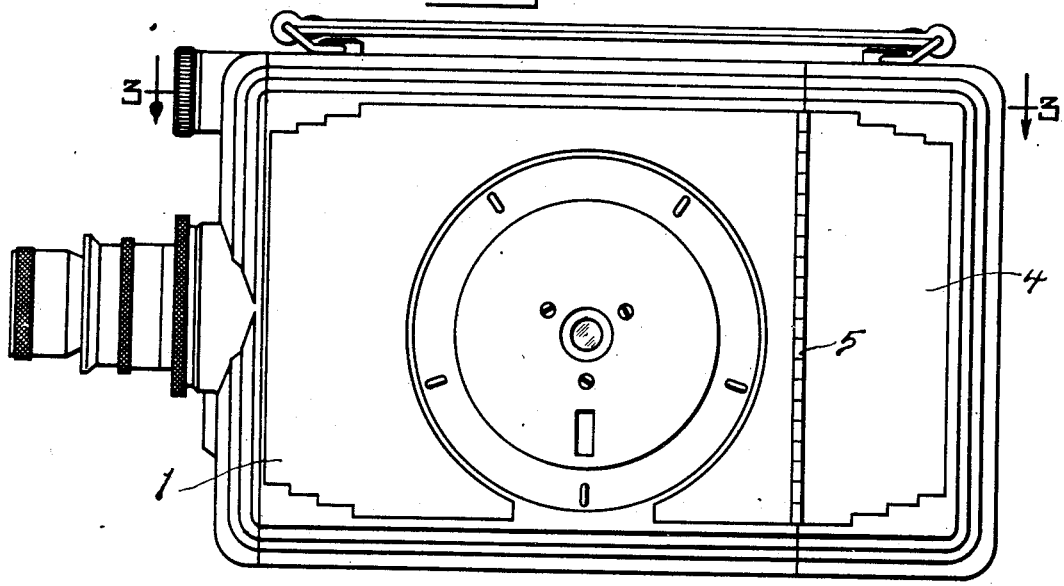
Figure 1 is a side elevation of a motion picture camera embodying my invention.

Referring to the drawings, I designates a camera casing of forwardly and rearwardly elongated form within which is secured a forwardly and rearwardly extending frame plate 2 disposed intermediate the sides of the casing and forming the inner side of a film magazine chamber 3.

The magazine chamber portion of the casing is provided with a rearwardly disposed access opening embracing portions of one side, the top, the bottom and rear wall thereof, and a cover 4 forms these portions of said walls and closes said opening, the side wall portion of the cover being hinged to the corresponding side wall of the casing, as designated at 5, for opening and closing movement and a latch device, generally designated at 6, serving to releasably secure the cover in closed position. See Figures 1 to 4.

A forwardly and rearwardly elongated film magazine, generally designated at 7, is interchangeably insertable in and removable from the film chamber 3 through the rear opening of the film chamber in a predetermined interchange path. The magazine is guided and positioned in the film chamber in the following manner. See Figures 2 to 4.

Two forwardly and rearwardly spaced contact studs 8 on the bottom wall of the casing engage the bottom of the magazine and a forwardly and rearwardly extending leaf spring 9, within the magazine chamber, has its rear end secured with the upper wall of the casing by means of screws 11, and has its intermediate portion bowed downwardly to engage the top of the magazine and maintain the magazine engaged with the contact studs 8.

Three triangularly spaced contact studs 12 on the frame plate 2 engage the inner face of the magazine. A forwardly disposed bow spring 13 secured on the side wall of the casing forming the outer side of the magazine chamber engages the outer face of the magazine and a spring 14 secured on the cover 4 engages, when the cover is closed, the rear outer vertical corner of the magazine in an angular direction with reference to the plane of the magazine, the springs 13 and 14 serving to maintain the magazine in engagement with the contact studs 12.

Figure 2:
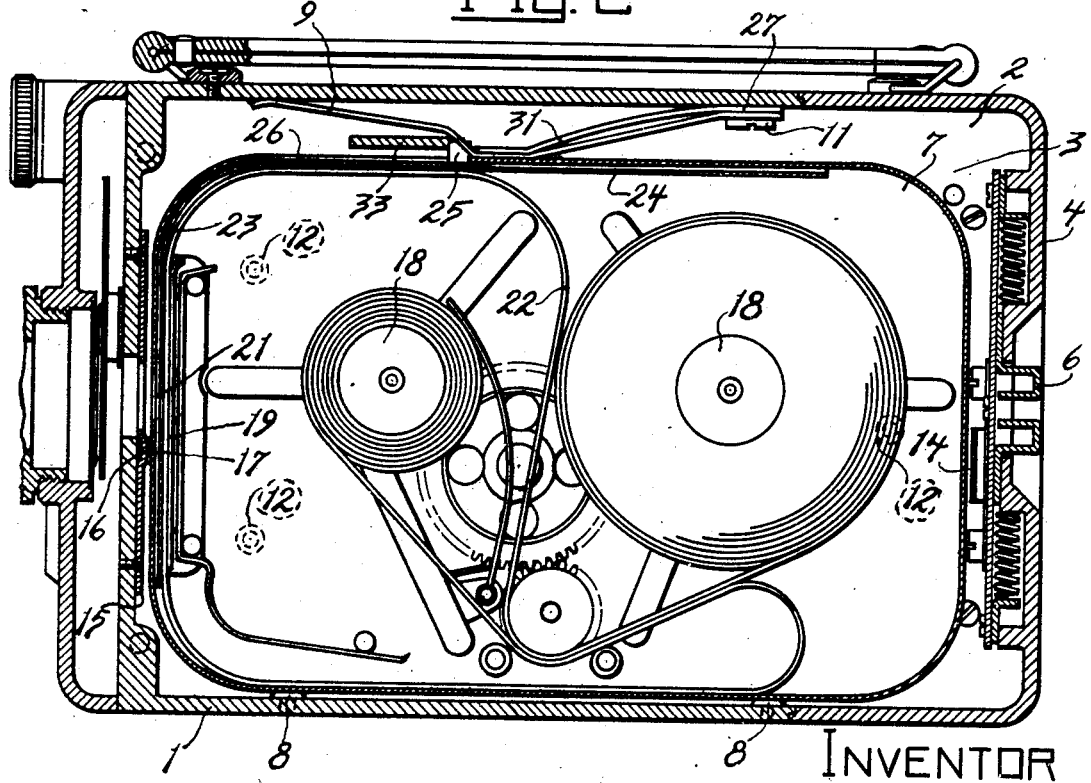
Figure 2 is a vertical sectional view of the same in similar elevation.

A plate 15, see Figure 2, secured within the casing at the forward end of the magazine chamber, is provided with a rearward extrusion 16 and is engaged with a contact button 17 on the front wall of the magazine to position the magazine forwardly, the spring 14 serving to maintain this engagement.

The magazine 7 as illustrated is of a known interchangeable type and embodies film spools 18 therein and an apertured intermittent feed guide, generally designated at 19, at the front wall thereof and having an exposure aperture 21, a film 22 within the magazine being fed from one film spool through the feed guide and wound on the other film spool for sequential exposure thereof in cooperation with suitable mechanism carried with the camera casing, all as is well known.

The magazine also carries a shutter mechanism for closing the exposure aperture 21 to the end of rendering the magazine light tight while not installed in the camera. This shutter mechanism as illustrated is of a known type and consists of a flexible metal shutter member 23 slidably carried in an angled guide 24 for movement to open and close the exposure aperture 21.

The shutter member 23 as well as the guide 24 extend forwardly and rearwardly along the upper wall of the magazine, and a stud 25 is secured with the forwardly and rearwardly extending portion of the shutter member and projects upwardly through a forwardly and rearwardly extending slot 26 through the upper wall of the magazine for actuation to open and close the shutter.

The stud 25 is thus actuable with respect to the magazine in correspondence with the interchange path of the magazine to open and close the magazine exposure aperture shutter, rearward movement of the stud 25 with respect to the magazine opening the shutter and forward movement of the stud with respect to the magazine closing the shutter. The intermediate portion of the spring 9 is provided with a longitudinally extending slot 27 through which the stud 25 passes as an incident of interchange of the magazine.

A leaf spring 28 is arranged between the spring 9 and the upper wall of the camera casing 1 and, extending forwardly and rearwardly, has its rear end secured with the camera casing by means of the screws 11. The spring 28 is provided with a slot 29 extending longitudinally from the forward end thereof to form parallel springs 31 between which the stud 25 passes as an incident of interchange of the magazine.

The springs 31 are operable transversely of the interchange path of the magazine and the forward or free ends thereof are provided with opposing cam formations 32 facing transversely of said interchange path and yieldably engageable with the stud 25 as an incident of interchange movement of the magazine, thus forming a spring pressed cam engagement operative transversely of said interchange path for engagement and disengagement automatically as an incident of magazine interchange.

The aforesaid spring pressed cam engagement is operative to effect actuation of the stud 25 with respect to the magazine corresponding with the aforesaid interchange path for shutter actuation, that is to say shutter closure with removal movement of the magazine and shutter opening with mounting movement of the magazine.

Preferably, the side of the camera casing 1 forming the outer wall of the magazine chamber is provided with an inwardly projecting abutment part 33 engageable with the stud 25 for effecting positive shutter opening movement of this stud with mounting movement of the magazine in case of failure of the aforesaid spring pressed cam engagement to effect opening of the shutter, and to provide assured closing of the shutter with removal movement of the magazine, the portions of the cam formations 32 opposing the stud 25 with removal movement of the magazine are relatively steep, as designated at 34.

Thus, the magazine shutter is actuated and the shutter actuating camera and magazine parts are engaged and disengaged all automatically as an incident of magazine interchange.

Figures 2 and 3 show the magazine in exposure position in the camera casing with the stud 25 in shutter opened position and engaged against the abutment part 33, and Figure 4 shows the magazine partially removed from the magazine with the stud 25 engaged with the portions 34 of the cam formations 32 preparatory to shutter closure with further removal movement of the magazine.

While I have thus described my invention, I do not wish to be limited to the precise details described as changes may be readily made without departing from the spirit of my invention, but having thus described my invention, I claim as new and desire to secure by Letters Patent the following:

1. In a photographic camera the combination with an exposure apertured film magazine and a camera structure adapted for the interchangeable mounting of said magazine thereon in a predetermined interchange path, of magazine aperture shutter actuating means comprising a camera part engaging a shutter part carried on the magazine for movement with respect thereto corresponding with said interchange path, and one of said actuating means parts comprising parallel springs extending longitudinally of and operable transversely of said interchange path and between which the other actuating means part passes as an incident of interchange movement of said magazine, said springs being provided with opposing cam formations yieldably engageable with said other actuating means part as an incident of said interchange movement.

2. In a photographic camera the combination with an exposure apertured film magazine and a camera structure adapted for the interchangeable mounting of said film magazine thereon in a predetermined interchange path, of magazine aperture shutter actuating means comprising a camera part engaging a shutter part carried on the magazine for movement with respect thereto corresponding with said interchange path, and said parts comprising a spring pressed cam engagement operative in both directions of said interchange path and yieldable transversely of said interchange path for engagement and disengagement in both such directions, said cam engagement being relatively steep with removal movement of said magazine to effect shutter closure, and an abutment part on said camera structure engageable with said magazine part to effect shutter opening with mounting movement of said magazine.

3. In a photographic camera the combination with an exposure apertured film magazine and a camera structure adapted for the interchangeable mounting of said magazine thereon in a predetermined interchange path, of magazine shutter actuating means comprising a camera part engaging a shutter part carried on the magazine for movement with respect thereto corresponding with said interchange path, and said camera part comprising a spring operable transversely of said interchange path and provided with a cam formation facing transversely of said interchange path for yielding engagement with said shutter part in both directions of said interchange path, the portion of said cam opposing said magazine part with removal movement of said magazine being relatively steep to effect shutter closure, and an abutment part on said camera structure engageable with said magazine part to effect shutter opening with mounting movement of said magazine.

ALBERT S. HOWELL.